(12) United States Patent
Brakes

(10) Patent No.: US 11,077,932 B2
(45) Date of Patent: Aug. 3, 2021

(54) AIRCRAFT WING AND LOCKING MECHANISM

(71) Applicant: Airbus Operations Limited, Bristol (GB)

(72) Inventor: David Brakes, Bristol (GB)

(73) Assignee: Airbus Operations Limited, Bristol (GB)

( * ) Notice: Subject to any disclaimer, the term of this patent is extended or adjusted under 35 U.S.C. 154(b) by 352 days.

(21) Appl. No.: 16/107,420

(22) Filed: Aug. 21, 2018

(65) Prior Publication Data
US 2019/0061911 A1  Feb. 28, 2019

(30) Foreign Application Priority Data
Aug. 23, 2017  (GB) ...................................... 1713566

(51) Int. Cl.
*B64C 3/56* (2006.01)
*B64C 23/06* (2006.01)

(52) U.S. Cl.
CPC .............. *B64C 3/56* (2013.01); *B64C 23/072* (2017.05)

(58) Field of Classification Search
CPC ... B64C 23/072; B64C 3/56; Y10T 292/0814; Y10T 292/0818; Y10T 292/1044
USPC .................................................. 244/3.29, 49
See application file for complete search history.

(56) References Cited

U.S. PATENT DOCUMENTS

| | | | | |
|---|---|---|---|---|
| 3,453,013 A | * | 7/1969 | Jeffries .................. | E05C 19/026 292/18 |
| 4,687,236 A | * | 8/1987 | Rasche ..................... | E05C 5/00 292/16 |
| 4,893,383 A | * | 1/1990 | Quickel ................. | A44B 11/266 24/647 |
| 5,050,817 A | * | 9/1991 | Miller ....................... | B60F 5/02 244/2 |
| 8,276,950 B2 | * | 10/2012 | Kutschat ............... | E05B 85/247 292/216 |
| 2010/0264260 A1 | | 10/2010 | Hammerquist | |
| 2013/0341467 A1 | * | 12/2013 | Sakurai ..................... | B64C 3/56 244/201 |

(Continued)

FOREIGN PATENT DOCUMENTS

| CN | 204078065 | 1/2015 |
|---|---|---|
| EP | 2 730 500 | 5/2014 |
| GB | 2 550 410 | 11/2017 |

OTHER PUBLICATIONS

Combined Search and Examination Report for GB1713566.6, dated Feb. 14, 2018, 6 pages.

*Primary Examiner* — Tien Q Dinh
*Assistant Examiner* — Madison Elizabeth Dittner
(74) *Attorney, Agent, or Firm* — Nixon & Vanderhye P.C.

(57) ABSTRACT

An aircraft wing (10) comprising a fixed wing (14) and a movable wing tip device (12). The wing tip device is movable between a flight configuration and a ground configuration, whereby in the ground configuration the span of the wing is reduced compared to the flight configuration. A locking mechanism (30) is provided to lock the wing tip device in the flight configuration, the locking mechanism includes a receiving socket (34) with a first latch and a second latch, and a locking pin (32). In the locked configuration, the locking pin is inserted into the receiving socket such that the first latch and second latch prevents removal of the locking pin from the receiving socket.

17 Claims, 10 Drawing Sheets

(56) References Cited

U.S. PATENT DOCUMENTS

2017/0066521 A1  3/2017  Fox et al.

* cited by examiner

AIRCRAFT WING AND LOCKING MECHANISM

RELATED APPLICATION

This application claims priority to United Kingdom Patent Application GB 1713566.6, filed Aug. 23, 2017, the entire contents of which is incorporated by reference.

BACKGROUND OF THE INVENTION

There is a trend towards increasingly large passenger aircraft, for which it is desirable to have correspondingly large wing spans. However, the maximum aircraft span is effectively limited by airport operating rules which govern various clearances required when manoeuvring around the airport (such as the span and/or ground clearance required for gate entry and safe taxiway usage).

Therefore, movable wing tip devices have been introduced into passenger aircraft, where a wing tip device is movable between a flight configuration for use during flight, and a ground configuration for use during ground-based operations. In the ground configuration, the wing tip device is moved away from the flight configuration such that the span of the aircraft wing is reduced, thereby allowing use of existing gates and safe taxi usage.

In order to securely fasten the wing tip device in the flight configuration, one or more locking mechanisms may be used. However, conventional locking mechanisms may not provide suitably secure fastening for the wing tip device. In particular, wear in the locking mechanism may result in play being introduced between the fixed wing and the wing tip device. Alternatively or additionally, the locking mechanisms may be complex, and/or fragile, and unsuitable for real world, day to day, operation.

US2017/0066521 discloses various locking mechanisms for movable wing tips.

The present invention seeks to mitigate the above-mentioned problems. Alternatively or additionally, the present invention seeks to provide an improved aircraft, aircraft wing, and locking mechanism.

SUMMARY OF THE INVENTION

The present invention provides, according to a first aspect, an aircraft comprising an aircraft wing, the aircraft wing comprising a fixed wing and a wing tip device at the tip thereof, wherein the wing tip device is configurable between (i) a flight configuration for use during flight, and (ii) a ground configuration for use during ground-based operations, in which ground configuration the wing tip device is moved away from the flight configuration such that the span of the aircraft wing is reduced, the aircraft wing further comprising a locking mechanism, the locking mechanism comprising a locked configuration for locking the wing tip device in the flight configuration and an unlocked configuration in which the wing tip device may move into and out of the flight configuration, the locking mechanism comprising a locking pin mechanically attached to one of the fixed wing and wing tip device, and a receiving socket mechanically attached to the other of the fixed wing and wing tip device, wherein the receiving socket is arranged to receive the locking pin when the wing tip device is in flight configuration such that when the locking mechanism is in the locked configuration the locking pin cannot be removed from the receiving socket, wherein the locking pin comprises a longitudinal axis, and a distal end, where at the distal end a first protrusion extends in a first direction perpendicular to the longitudinal axis, and a second protrusion extends in a second direction perpendicular to the longitudinal axis, where the first direction is opposite to the second direction, and the receiving socket comprises a receiving section for receiving the first protrusion and second protrusion, the receiving socket further comprising a first rotatable latch and second rotatable latch, the first rotatable latch and second rotatable latch arranged to engage with, and block, the removal of the first protrusion and second protrusion respectively when the locking mechanism is in the locked configuration, the first rotatable latch and second rotatable latch arranged to allow movement of the first protrusion and second protrusion into and out of the receiving portion when the locking mechanism is in the unlocked configuration.

The first rotatable latch may be one of a first pair of rotatable latches. The second rotatable latch may be one of a second pair of rotatable latches. Provision of a first pair of rotatable latches and second pair of rotatable latches may result in a loads experienced by the locking mechanism, particularly tension loads, being evenly distributed through the rotation points of each of the latches comprising the pairs of latches. In the following description, features described with respect to the pairs of rotatable latches may be equally applicable to a single rotatable latch, where only a single rotatable latch is provided.

The locking pin may be mechanically attached to the fixed wing or wing tip device by a pivot. Providing such an attachment may allow for angular misalignment between the locking pin and receiving socket to be compensated for. The degree of movement available to the locking pin may be relatively small, for example, 1 degree, or between 1 degree and 5 degrees.

The first, or first pair, of rotatable latches and second, or second pair of rotatable latches may share rotational axes. The first rotatable latch may share a pivot shaft with the second rotatable latch. One of the first pair of rotatable latches may share a pivot shaft with one of the second pair of rotatable latches. The other of the first pair of rotatable latches may share a pivot shaft with the other of the second pair of rotatable latches. The axes of rotation of the first pair of rotatable latches and second pair of rotatable latches may be to either side of, and perpendicular to, the longitudinal axis of the locking pin. The individual latches making up a pair of rotatable latches may be arranged to rotate in opposite directions during the locking and unlocking of the locking mechanism.

The first protrusion and second protrusion on the locking pin may be symmetric about the longitudinal axis of the locking pin. The arrangement of a symmetric locking pin, and provision of a first pair of rotatable latches and second pair of rotatable latches, provides a balanced locking mechanism, and reduces or removes the potential for shear loads across the locking mechanism. The first protrusion and second protrusion may have a front face at the distal end of the locking pin, which leads the insertion of the locking pin into the receiving socket when the locking mechanism is moved into the locked configuration. The front face may correspond in shape to the shape of the receiving portion of the receiving socket, for example if the front face is approximately semi-circular in cross section, the receiving socket may be approximately semi-circular, with approximately the same dimensions. The receiving portion, and in particular the receiving socket, may comprise a hard stop to the locking pin when the locking mechanism is in the locked configuration. Provision of a hard stop as described may reduce the degrees of freedom present within the locking mechanism, thereby reducing the tolerance levels required to provide an adequate locking mechanism. During movement of the locking mechanism into the locked configuration, the locking pin may be preloaded against the receiving portion of the receiving socket. Such an arrangement removes one degree of freedom during the locking process, thereby making manufacture of the locking mechanism more straightforward, and helping to provide a smooth and straightforward locking process. The contact between the protrusions and the receiving portion may be such that when the locking mechanism is in the locked configuration, and loaded under compression, the force transferred to the receiving portion is perpendicular to the contact surfaces between the protrusions and receiving portion.

The first protrusion and second protrusion may have end faces, the end faces symmetric to each other. Each latch of the rotatable latches may have an engagement face, the engagement face arranged to engage with, and block removal of, the end faces of the first protrusion and second protrusion when the locking mechanism is in the locked configuration. The engagement faces of the rotatable latches may correspond in profile with the profiles of the end faces of the first protrusion and second protrusion. For example, the engagement faces and end faces may have a cross-section which corresponds to an arc of a circle, or an arc of an ellipse. When the locking pin is preloaded against the receiving socket, a clearance is guaranteed between the end faces of the first protrusion and second protrusion and the rotatable latches. Should the locking pin be pulled away from the socket during locking, the rotatable latches may jam against the first protrusion and second protrusion rather than cleanly engaging with the end faces. Therefore, the use of the receiving socket as a hard stop, and preloading the locking pin against the receiving socket during the locking process, can be seen to be particularly advantageous.

Preferably, when the locking mechanism is in the locked configuration, and the locking mechanism is loaded under tension, the force is transmitted from the first and second protrusion to the first pair of latches and second pair of latches such that the direction of the force is perpendicular to the contact faces. Preferably, in such an arrangement, the force transmitted from the locking pin to the pairs of latches is directed through the pivot points of the rotatable latches. Advantageously, providing such an arrangement, where the tension is transmitted directly through the pivot points of the rotatable latches, means that the force acting on the locking mechanism is purely compressive and balanced across the latches. There is no moment around the pivot points, which would either cause the latches to be urged apart and potentially unlock the locking mechanism, or cause the latches to be urged together, potentially damaging the locking mechanism. In lay terms, the shape of the distal end of the locking pin may be described as a "hammerhead" shape.

The rotatable latches may be arranged to be driven by an actuator to control the rotational movement of the latches. Such an actuator may be used to rotate the latches out of the way of the locking pin when the locking mechanism is moved from the unlocked configuration to locked configuration. Once the locking pin is sufficiently located within the receiving portion of the receiving socket, the actuator may be used to rotate the latches such that they prevent removal of the locking pin from the receiving socket, which may be considered an "active" locking arrangement. Alternatively, the action of moving the locking pin into the receiving portion of the receiving socket may push the rotatable latches out of the way. The rotatable latches may be spring loaded such that once the locking pin has moved past a certain tipping point, the rotatable latches rotate into a position in which they block removal of the locking pin from the receiving socket, which may be considered a "passive" locking arrangement. The physical arrangement of the locking members may be such that the rotatable latches provide a mechanical lock when in the locked configuration. Additionally, or alternatively, there may be a secondary lock associated with the rotatable latches to ensure that the locked configuration is secure.

The actuator may be used to rotate the latches when the locking mechanism is in the locked configuration such that the latches no longer prevent removal of the locking pin from the receiving section, and hence move the locking mechanism into the unlocked configuration. The latches may be arranged such that a single actuator may control movement of all of the latches making up the locking mechanism.

The locking pin may be mechanically attached to the fixed wing, and the receiving section may be mechanically attached to the wing tip device. Alternatively, the locking pin may be mechanically attached to the wing tip device, and the receiving section may be mechanically attached to the wing tip device. Preferably, to provide mechanical simplicity in the wing tip device, the locking pin is mechanically attached to the wing tip device. Where the term "mechanically attached to" is used, it is intended to be interpreted to mean that the locking pin, or the receiving portion, remains attached to, and forms part of, the fixed wing or wing tip device regardless of whether the aircraft is in the flight configuration or ground configuration.

The aircraft wing may comprise a plurality of locking mechanisms as previously described. The plurality of locking mechanisms may be located in linear alignment with each other, thereby increasing the stiffness of the connection between the fixed wing and wing tip device when in the locked flight configuration. The plurality of locking mechanisms may be actuated by a common actuator ensuring smooth and consistent engagement of the locking mechanism when moving into the locked flight configuration.

The wing tip device may be connected to the fixed wing by a hinge, for example a piano hinge. In an alternative arrangement, the wing tip device may be connected to the fixed wing by a slew ring.

The wing tip device may be a wing tip extension; for example the wing tip device may be a planar tip extension. In other embodiments, the wing tip device may comprise, or consist of, a non-planar device, such as a winglet. In the flight configuration the trailing edge of the wing tip device is preferably a continuation of the trailing edge of a fixed wing. The leading edge of the wing tip device is preferably a continuation of the leading edge of the fixed wing. There is preferably a smooth transition from the fixed wing to the wing tip device. It will be appreciated that there may be a smooth transition, even where there are changes in sweep or twist at the junction between the fixed wing and wing tip device. However, there are preferably no discontinuities at the junction between the fixed wing and wing tip device. The upper and the lower surfaces of the wing tip device may be continuations of the upper and lower surfaces of the fixed wing. The span ratio of the fixed wing relative to the wing tip device may be such that the fixed wing comprises 70%, 80%, 90%, or more, of the overall span of the aircraft wing.

When the wing tip device is in the ground configuration, the aircraft may be unsuitable for flight. For example, the wing tip device may be aerodynamically and/or structurally unsuitable for flight in the ground configuration. The aircraft is preferably configured such that, during flight, the wing tip device is not moveable to the ground configuration. The aircraft may comprise a sensor for sensing when the aircraft is in flight. When the sensor senses that the aircraft is in flight, a control system is preferably arranged to disable the possibility of moving the wing tip device to the ground configuration.

All aspects of the invention may be applicable to various types of moveable wing tip device (i.e. various different arrangements if rotational movement between flight and ground configurations). In all cases, the axis of rotation is preferably orientated such that when the wing tip device is rotated about the axis, from the flight configuration to the ground configuration, the span of the aircraft wing is reduced. In the flight configuration, the span may exceed an airport compatibility limit. In the ground configuration the span may be reduced such that the span (with the wing tip device in the ground configuration) is less than, or substantially equal to, the airport compatibility limit. The airport compatibility limit is a span limit (for example relating to clearance restrictions for buildings, signs, other aircraft). The compatibility limit is preferably a gate limit.

The aircraft is preferably a passenger aircraft. The passenger aircraft preferably comprises a passenger cabin comprising a plurality of rows and columns of seat units for accommodating a multiplicity of passengers. The aircraft may have a capacity of at least 20, more preferably at least 50 passengers, and more preferably more than 50 passengers. The aircraft is preferably a powered aircraft. The aircraft preferably comprises an engine for propelling the aircraft. The aircraft may comprise wing-mounted, and preferably underwing, engines.

According to a second aspect of the invention, there is provided an aircraft wing, the aircraft wing comprising a fixed wing and a wing tip device at the tip thereof, wherein the wing tip device is configurable between (i) a flight configuration for use during flight, and (ii) a ground configuration for use during ground-based operations, in which ground configuration the wing tip device is moved away from the flight configuration such that the span of the aircraft wing is reduced, the aircraft wing further comprising a locking mechanism, the locking mechanism comprising a locked configuration for locking the wing tip device in the flight configuration and an unlocked configuration in which the wing tip device may move into and out of the flight configuration, the locking mechanism comprising a locking pin mechanically attached to one of the fixed wing and wing tip device, and a receiving socket mechanically attached to the other of the fixed wing and wing tip device, wherein the receiving socket is arranged to receive the locking pin when the wing tip device is in flight configuration such that when the locking mechanism is in the locked configuration the locking pin cannot be removed from the receiving socket, wherein the locking pin comprises a longitudinal axis, and a distal end, where at the distal end a first protrusion extends in a first direction perpendicular to the longitudinal axis, and a second protrusion extends in a second direction perpendicular to the longitudinal axis, where the first direction is opposite to the second direction, and the receiving socket comprises a receiving section for receiving the first protrusion and second protrusion, the receiving socket further comprising a first rotatable latch and second rotatable latch, the first rotatable latch and second rotatable latch arranged to engage with, and block, the removal of the first protrusion and second protrusion respectively when the locking mechanism is in the locked configuration, the first rotatable latch and second rotatable latch arranged to allow movement of the first protrusion and second protrusion into and out of the receiving portion when the locking mechanism is in the unlocked configuration.

According to a third aspect of the invention, there is provided a method of locking an aircraft wing of an aircraft, the aircraft according to the first aspect of the invention, wherein the method comprises the steps of moving the wing tip device from the ground configuration to the flight configuration, thereby inserting the locking pin into the receiving socket such that the first rotatable latch and second rotatable latch obstruct removal of the locking pin from the receiving socket.

According to a fourth aspect of the invention, there is provided a method of unlocking an aircraft wing of an aircraft, the aircraft according to the first aspect of the invention, wherein the aircraft wing is in the locked flight configuration, the method comprising the steps of actuating the first rotatable latch and second rotatable latch such that they no longer obstruct removal of the locking pin from the receiving socket, and moving the wing tip device into the ground configuration.

According to a fifth aspect of the invention, there is provided an aircraft comprising a wing, the wing having a fixed wing with a moveable wing tip device moveably mounted at the outer end thereof for reducing the span on the ground, the aircraft further comprising: a locking assembly for holding the wing tip device in a flight configuration, wherein the locking assembly comprises a locking socket and a locking link, the locking socket further comprising first and second rotatable latches, wherein when the locking assembly is in a locked configuration, the locking link is driven into the locking socket such that the first and second rotatable latches prevent removal of the locking link from the locking socket, and when the locking assembly is in an unlocked configuration, the first and second rotatable latches allow removal of the locking link from the locking socket.

According to a sixth aspect of the invention, there is provided a kit of parts comprising a wing tip device, fixed wing, and locking mechanism for use in assembling an aircraft or aircraft wing as described with relation to any of the first, second, or fifth, aspect of the invention.

It will of course be appreciated that features described in relation to one aspect of the present invention may be incorporated into other aspects of the present invention. For example, the method of the invention may incorporate any of the features described with reference to the apparatus of the invention and vice versa. Features described with reference to the aircraft of the first aspect may also be applicable to any or all of the other aspects of the invention, and vice versa.

The term 'or' shall be interpreted as 'and/or' unless the context requires otherwise.

DESCRIPTION OF THE DRAWINGS

Embodiments of the present invention will now be described by way of example only with reference to the accompanying schematic drawings of which.

DETAILED DESCRIPTION

Figure 1:
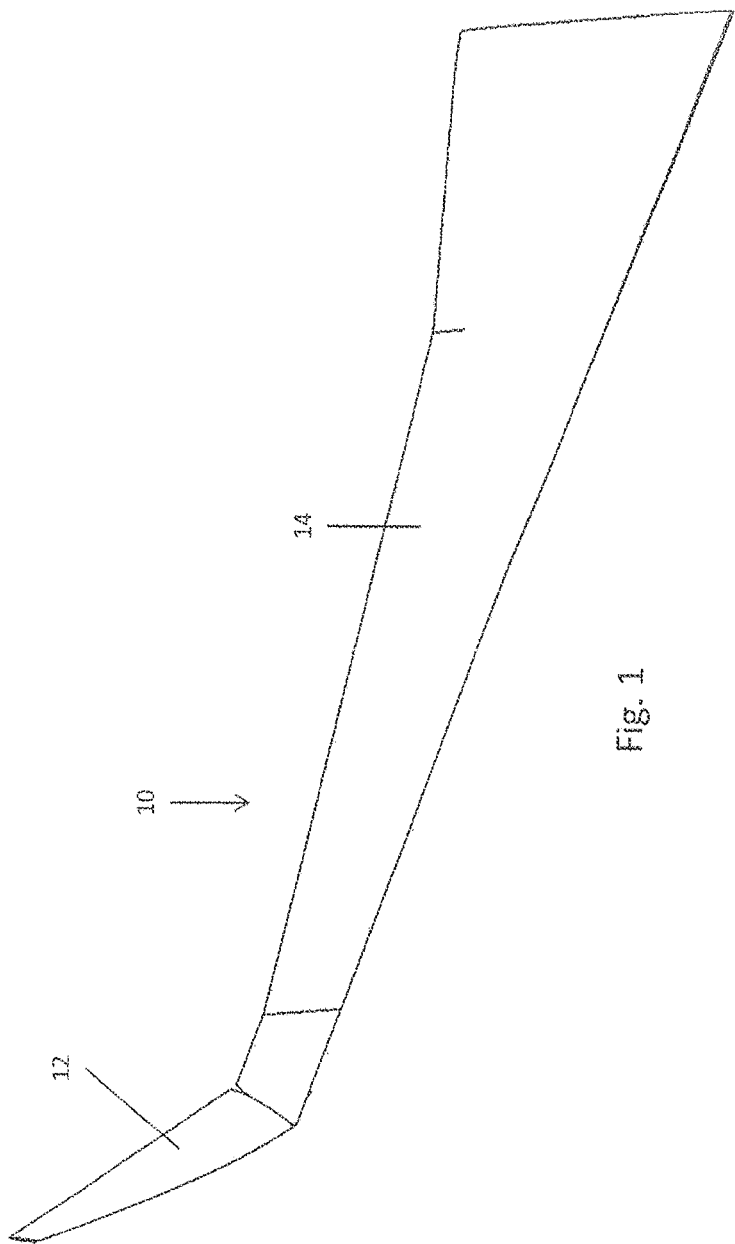
FIG. 1 shows a schematic view of a wing according to a first embodiment of the invention.
Figure 2:
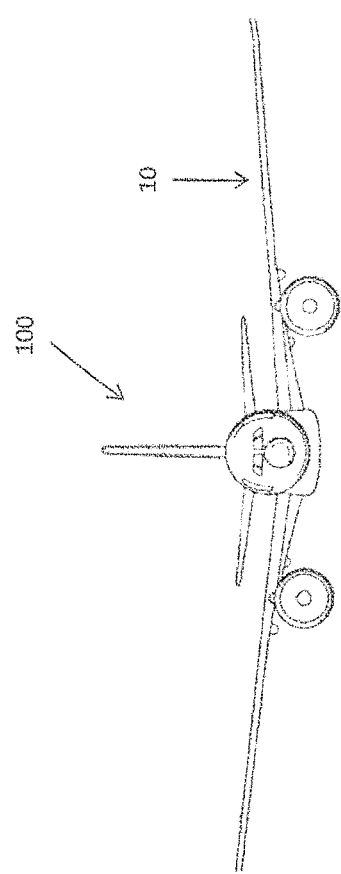
FIG. 2 shows a schematic view of an aircraft wing comprising a wing as shown in FIG. 1.

FIG. 1 shows a wing 10 comprising a wing tip device 12 and a fixed wing 14. FIG. 2 shows an aircraft 100 comprising the wing 10. The wing tip device 12 is configurable between: (i) a flight configuration for use during flight, as shown in FIG. 2 and (ii) a ground configuration for use during ground-based operations, as shown in FIG. 1, in which ground configuration the wing tip device 12 is moved away from the locked flight configuration such that the span of the aircraft wing 10 is reduced.

Figure 3:
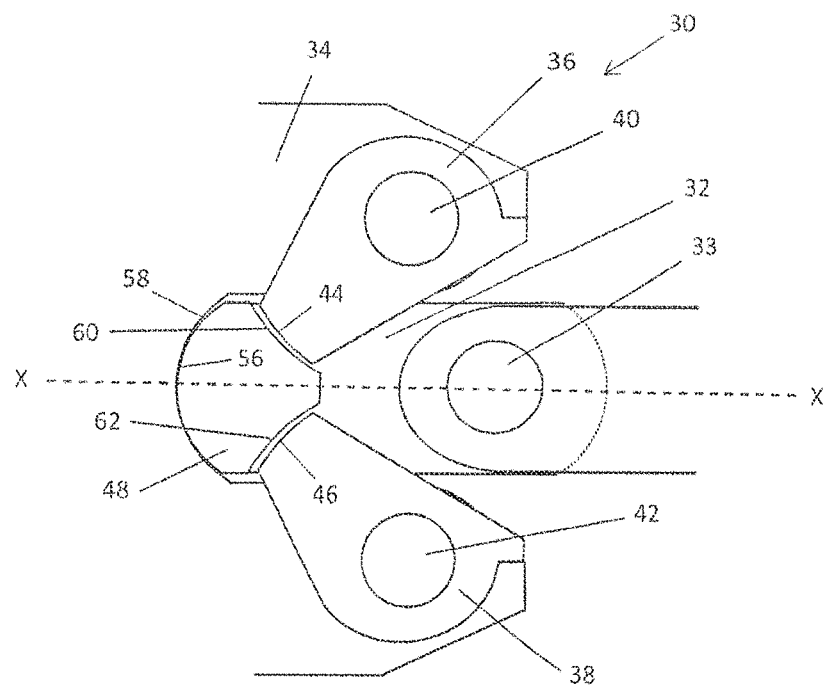
FIG. 3 shows a cross-sectional view of a locking mechanism according to a second embodiment of the invention; the locking mechanism in a locked configuration

FIG. 3 shows a locking mechanism 30 comprising a locking pin 32 and a receiving socket 34. The locking pin 32 is pivotally attached to an element of a wing tip device 33, allowing a small amount of pivoting movement and thereby reducing the tolerances required when producing the locking mechanism 30. The receiving socket is mechanically attached to part of a fixed wing. The skilled person will recognise that this arrangement could be reversed and still fit within the scope of the invention.

Figure 5:
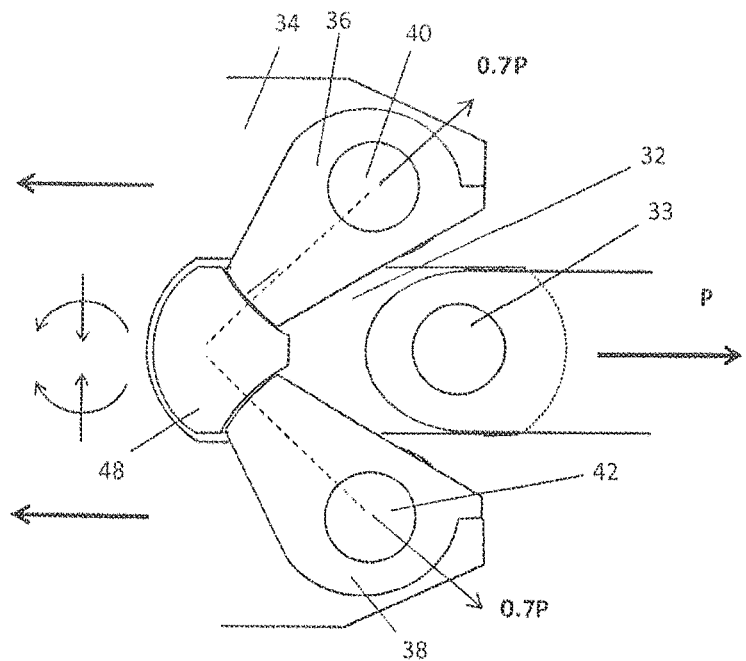
FIG. 5 shows the locking arrangement of FIG. 3 when under tension.
Figure 6:
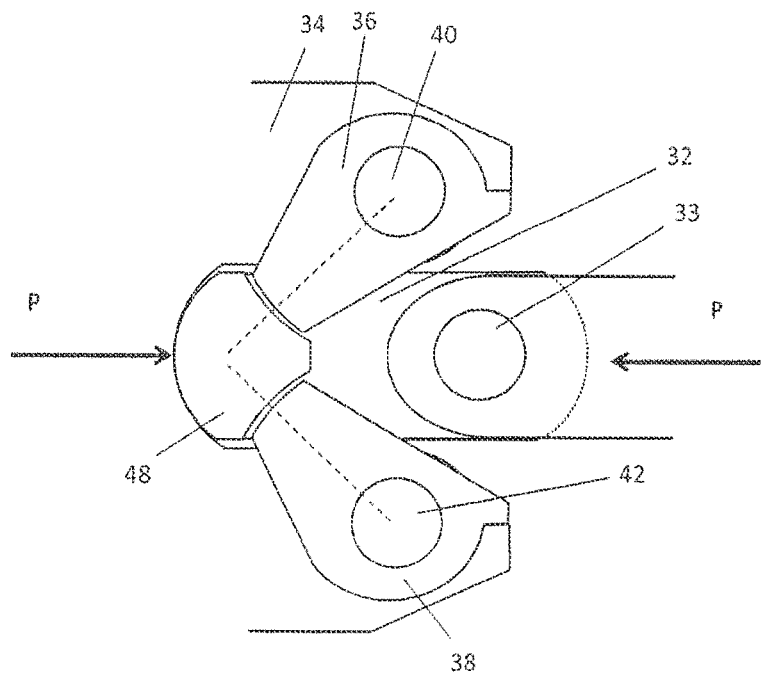
FIG. 6 shows the locking arrangement of FIG. 3 when under compression.
Figure 13:
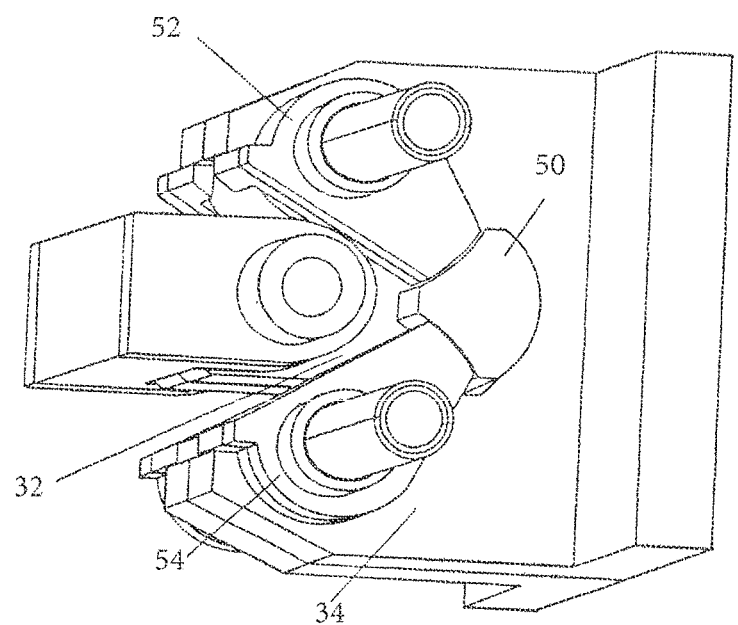

The receiving socket comprises a first pair of latches 36, 38, which are cam shaped and rotatably mounted to the socket 34 at pivot points 40 and 42 respectively. Each individual latch 36, 38, includes an engagement face 44, 46 respectively. The locking pin 32 comprises a distal end, with a first protrusion 48 and second protrusion 50 (shown in FIG. 13) located to either side of the longitudinal axis X of the locking pin 32. The first protrusion 48 and second protrusion are identical and symmetric, so the description of the protrusion 48 may be equally applied to the second protrusion 50. A second pair of latches 52, 54 is also disposed on the opposite side of the locking pin 32, and are identical to the latches 36, 38, and so the description of the first pair of latches 36, 38, may be equally applied to the second pair of latches 52, 54. The provision of two pairs of latches, disposed to either side of the locking pin 32, creates a balanced shear load across the locking mechanism. The first protrusion 48 comprises a front face 56 with a semicircular, or arc of a circle, cross section. The receiving socket 34 comprises a receiving portion 58 with a corresponding cross section. The first protrusion 48 also comprises a first end face 60 and second end face 62, which correspond in shape to the respective engagement faces 44, 46, of the first pair of latches 36, 38. As shown in FIG. 3, when in the locked configuration, if the locking mechanism 30 is put under tension P, such that the locking pin 32 is urged away from the receiving socket 34, the end faces 60 and 62 engage with the engagement faces 44, 46, and the first pair of latches 36, 38, prevent the removal of the locking pin 32 from the receiving socket. The mechanical arrangement of the locking mechanism 32 is such that the tension P is transmitted through the latches 36, 38, through the pivot points 40, 42, thereby spreading the force equally across the mechanism, and giving a secure hold (shown in FIG. 5). The arrangement is such that the latches do not experience any moment when the locking mechanism is under tension, thereby providing a mechanically balanced system. Advantageously, the present arrangement is such that neither latch experiences the full tension load P, but only a proportion of the load. The first pair of latches 36, 38, may also be associated with a secondary locking mechanism, arranged to prevent rotation of the first pair of latches 36, 38, when in the locked configuration, thereby providing further security to the locking mechanism 30 in addition to the mechanical lock provided by the system. FIG. 6 shows the locking mechanism 30 under a compression load P, which acts through the locking pin 32 against the receiving portion 58 (shown in FIG. 6).

Figure 4:
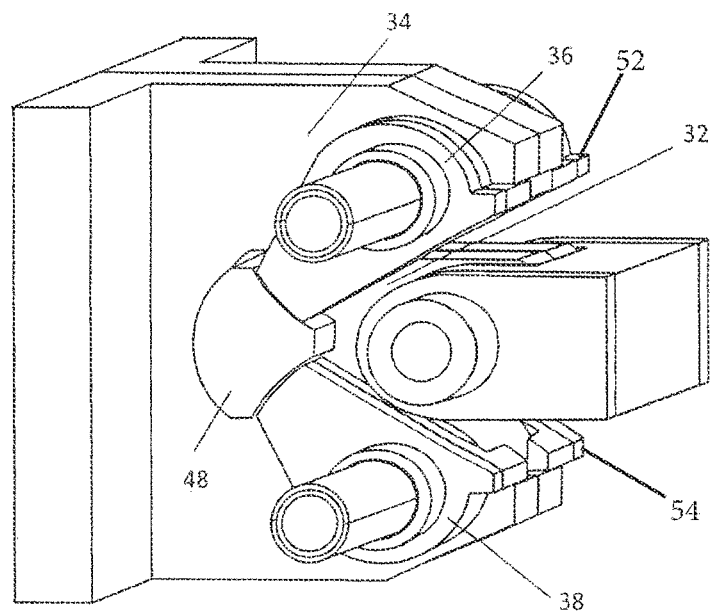
FIGS. 4 and 13 show left and right side isometric views, respectively, of a locking mechanism as shown in FIG. 3, the locking mechanism in the unlocked configuration.

FIG. 4 is a three dimensional representation of the locking mechanism, making it easier to see the second pair of latches and how they engage with the second protrusion from the locking pin. Providing a first pair of latches and second pair of latches as shown makes the locking mechanism symmetric, and balances potential forces which will be experienced by the locking mechanism when in the locked configuration.

Figure 7:
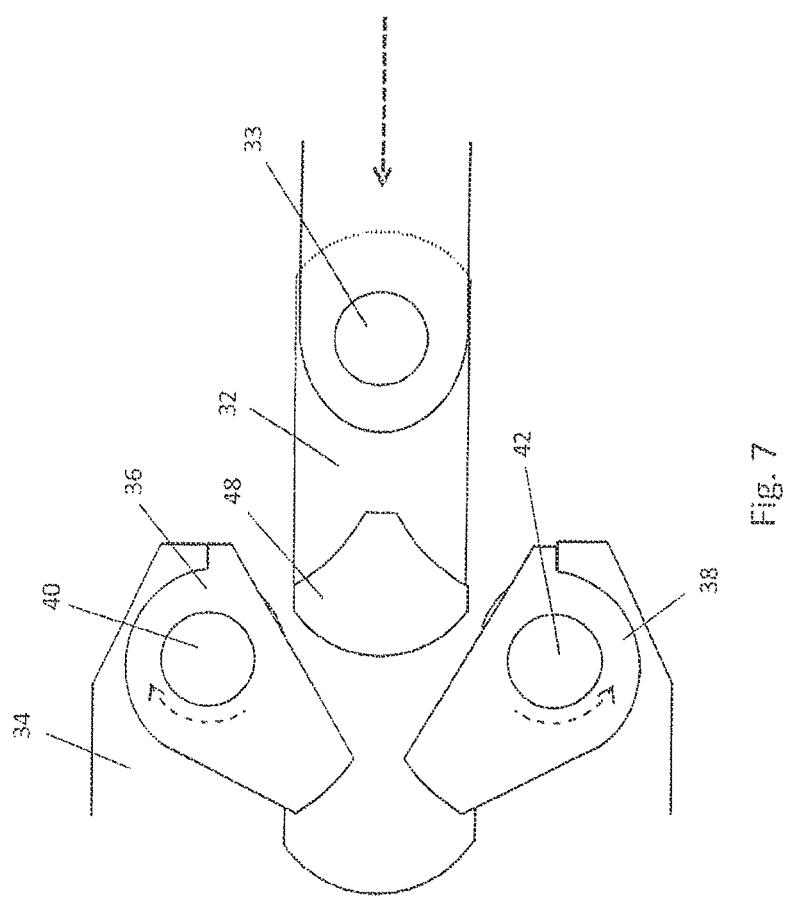
FIGS. 7 and 8 show the locking arrangement of FIG. 3 part way through an active locking process.
Figure 8:
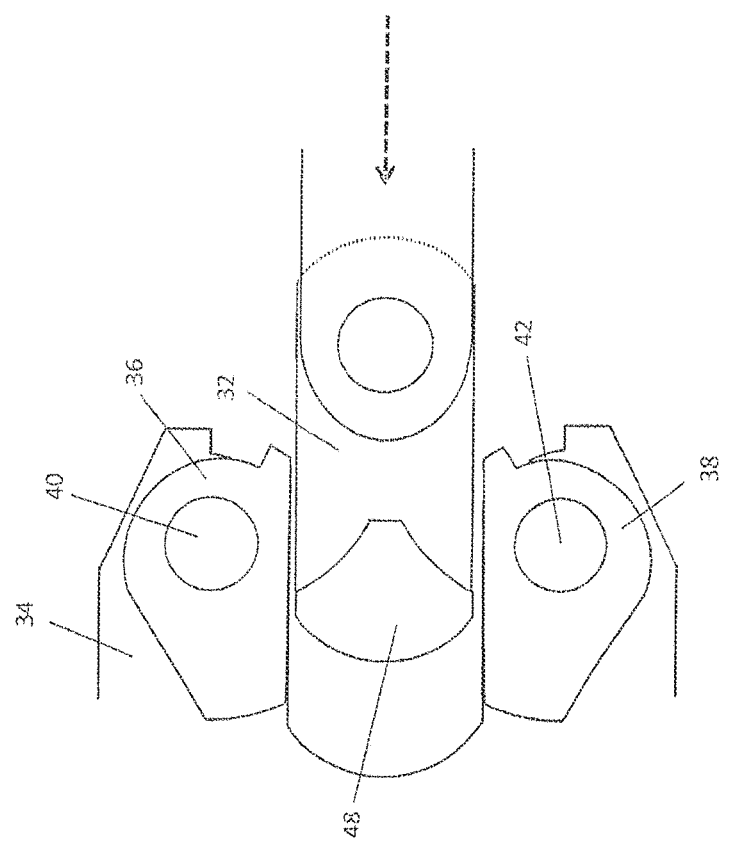
Figure 9:
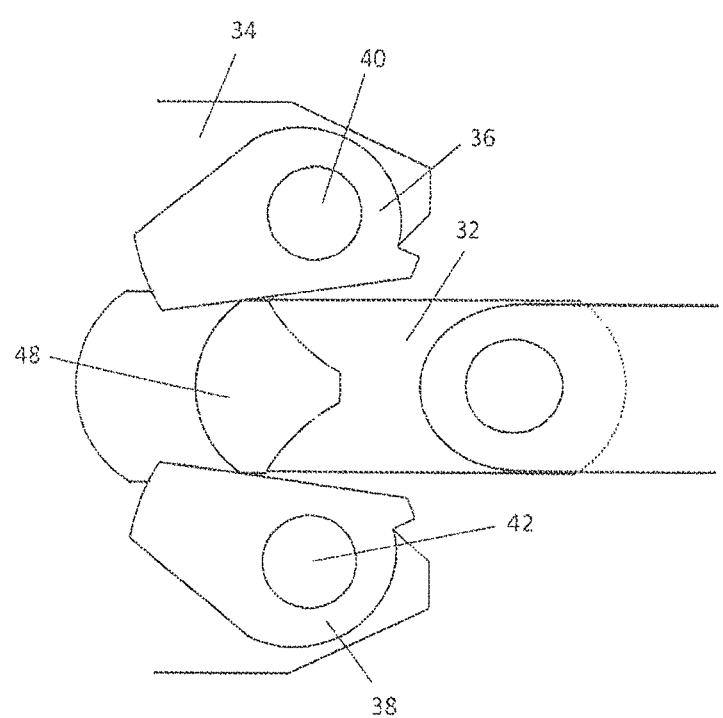
FIG. 9 shows the locking arrangement of FIG. 3 part way through a passive locking process.

FIG. 7 shows the locking mechanism 30 in an unlocked configuration. In order to lock the locking mechanism 32, in what can be considered an active locking arrangement, the first pair (and second pair) of latches are rotated such that the do not obstruct movement of the locking pin 32 into the receiving portion 58. In this embodiment, the receiving socket 34 comprises an actuator (not shown) which rotates the first pair of latches 36, 38 out of the way. In an alternative embodiment, which may be considered a passive locking arrangement, the insertion of the locking pin 32 into the receiving portion may push the first pair of latches 36, 38 out of the way. The latches 36, 38 are then rotated, either by an actuator or by being spring loaded, back into position, such that removal of the locking pin 32 from the receiving portion 58 is prevented. As already described, a secondary lock may be utilised to further secure the first pair of latches 36, 38, against any rotation that would allow locking pin 32 removal. FIG. 8 shows the locking pin 32 part way along being inserted into the receiving portion 58. As can be seen, the first pair of latches 36, 38, have been fully actuated out of the way of the locking pin 32, demonstrating the active locking arrangement. FIG. 9 shows how the front face of the locking pin 32 may push the first pair of latches 36, 38, out of the way in the passive locking arrangement.

Figure 10:
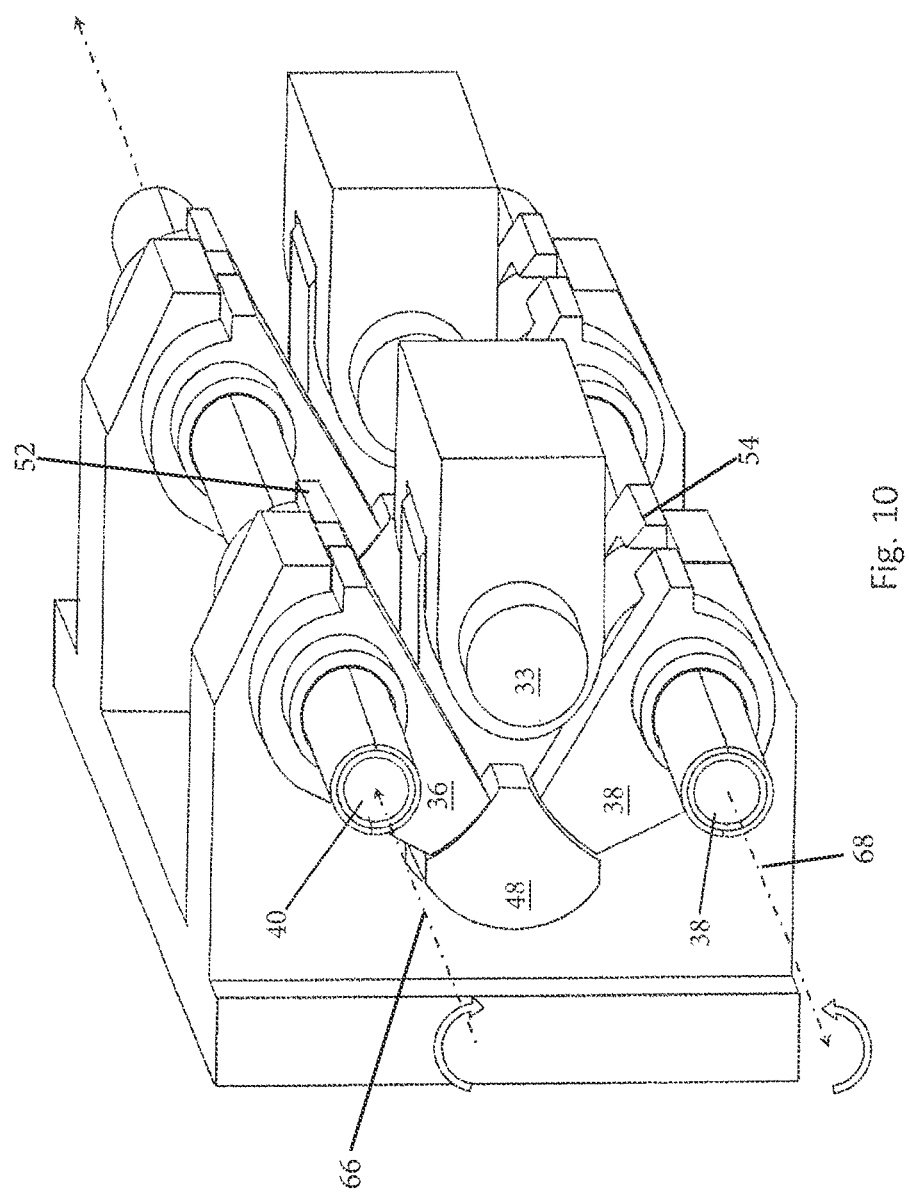
FIG. 10 shows a third embodiment of the invention, where two locking mechanisms are shown.

FIG. 10 shows a third embodiment of the invention, where first and second locking mechanisms are provided. The first and second locking mechanisms are laterally disposed relative to each other, with the pairs of rotatable latches sharing axes 66, 68 of rotation across both the first locking mechanism and second locking mechanism. Providing a plurality of locking mechanism results in a stiffer connection between the fixed wing and the wing tip device when in the locked flight configuration, and allows various axial and shear loads to be better tolerated by the locking mechanisms.

Figure 11:
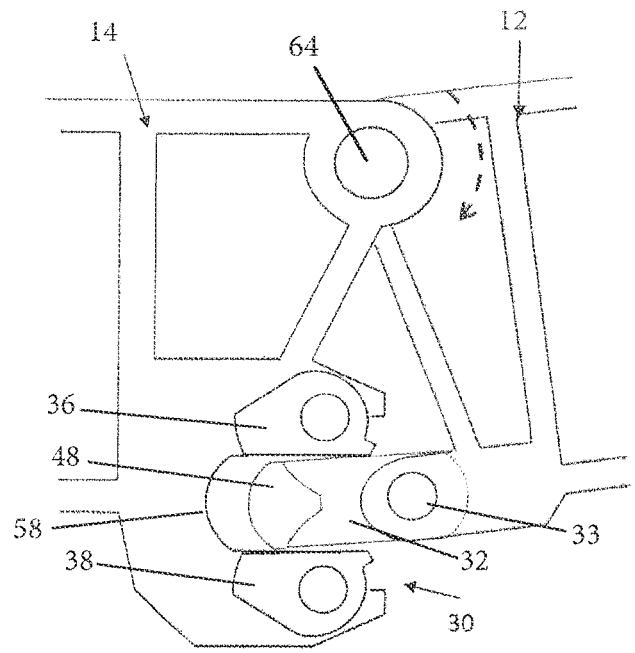
FIG. 11 shows a section of a wing comprising a locking mechanism as shown in FIG. 1 moving towards the flight configuration.
Figure 12:
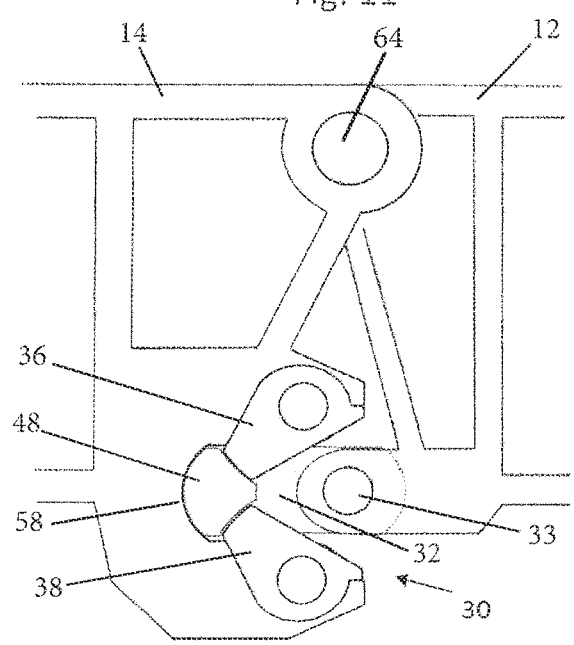
FIG. 12 shows the section of the wing shown in FIG. 11, with the wing tip device in the flight configuration.

FIGS. 11 and 12 show the locking mechanism as described with reference to FIG. 1, further showing the hinge 64 between the fixed wing 100 and the wing tip device 102. The figures illustrate how the arrangement moves from an unlocked configuration (FIG. 11) into the locked flight configuration (FIG. 12).

Whilst the present invention has been described and illustrated with reference to particular embodiments, it will be appreciated by those of ordinary skill in the art that the invention lends itself to many different variations not specifically illustrated herein. By way of example only, certain possible variations will now be described. The locking pin and first and second pair of latches may be shaped in many different, complimentary ways, whilst still providing the mechanical advantage as described above. In an alternative embodiment, it will be easily understood by a person skilled in the art that a single rotatable latch may be provided to each side of the locking pin.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. An aircraft comprising an aircraft wing, the aircraft wing comprising:
    a fixed wing, and
    a wing tip device at a tip of the fixed wing, wherein the wing tip device is configurable between (i) a locked flight configuration for use during flight, and (ii) a ground configuration for use during ground-based operations, while in the ground configuration the wing tip device is moved away from the locked flight configuration such that the span of the aircraft wing is reduced,
    the aircraft wing further comprising a locking mechanism, the locking mechanism comprising:
    a locked configuration for locking the wing tip device in the locked flight configuration, and
    an unlocked configuration in which the wing tip device is configured to move into and out of the flight configuration,
    the locking mechanism further comprising:
    a locking pin mechanically attached to one of the fixed wing and wing tip device, and
    a receiving socket mechanically attached to the other of the fixed wing and wing tip device,
    wherein the receiving socket is arranged to receive the locking pin when the wing tip device is in the locked flight configuration such that when the locking mechanism is in the locked configuration the locking pin cannot be removed from the receiving socket,
    wherein the locking pin comprises a longitudinal axis and a distal end, where at the distal end a first protrusion extends in a first direction perpendicular to the longitudinal axis, and a second protrusion extends in a second direction perpendicular to the longitudinal axis, where the first direction is opposite to the second direction, and
    the receiving socket comprises a receiving section for receiving the first protrusion and the second protrusion, the receiving socket further comprising:
    a first pair of rotatable latches on a first side of the receiving socket and including a first latch configured to engage a first rearward end face of the first protrusion and a second latch configured to engage a second rearward end face of the first protrusion, and
    a second pair of rotatable latches on a second side of the receiving socket, opposite to the first side, the second pair of rotatable latches including a first latch configured to engage a first rearward end face of the second protrusion and a second latch configured to engage a second rearward end face of the first protrusion,
    wherein the first pair of rotatable latches and the second pair of rotatable latches are arranged to block removal of the first protrusion and the second protrusion respectively when the locking mechanism is in the locked configuration, and
    wherein the first pair of rotatable latches and the second pair of rotatable latches are arranged to allow movement of the first protrusion and the second protrusion into and out of the receiving portion when the locking mechanism is in the unlocked configuration.

2. The aircraft as claimed in claim 1, wherein the locking pin is mechanically attached to the fixed wing or wing tip device by a pivot.

3. The aircraft as claimed in claim 1, wherein the first latch of first pair of rotatable latches and the first latch of the second pair of rotatable latches rotate about a first rotational axis, and the second latch of the first pair of rotatable laches and the and the second latch of the second pair of rotatable latches rotate about a second rotational axis offset from the first rotational axis.

4. The aircraft as claimed in claim 1, wherein the first protrusion and the second protrusion on the locking pin are symmetric about the longitudinal axis of the locking pin.

5. The aircraft as claimed in claim 1, wherein the first protrusion and the second protrusion have a front face at the distal end of the locking pin, where the front faces of the first and second protrusions lead insertion of the locking pin into the receiving socket when the locking mechanism is moved into the locked configuration.

6. The aircraft as claimed in claim 5, wherein the front face corresponds in shape to the shape of the receiving portion of the receiving socket.

7. The aircraft as claimed in claim 1, wherein the receiving portion comprises a hard stop to the locking pin when the locking mechanism is in the locked configuration.

8. The aircraft as claimed in claim 1, wherein the first and second rearward end faces of the first protrusion are symmetrically arranged on the first protrusion, and the first and second rearward end faces of the second protrusion are symmetrically arranged on the second protrusion.

9. The aircraft as claimed in claim 1, wherein the first pair of rotatable latches latch and the second pair of rotatable latches are arranged to be driven by an actuator to control the rotational movement of the latches.

10. The aircraft as claimed in claim 1, wherein the first pair of rotatable latches and the second pair of rotatable latches are each spring loaded such that once the locking pin has moved past a certain threshold point, the first pair of rotatable latches and the second pair of rotatable latches rotate into the locked configuration.

11. The aircraft as claimed in claim 1, comprising an actuator arranged to rotate the latches of the first pair of latches and the latches of the second pair of latches such that the latches no longer prevent removal of the locking pin from the receiving section.

12. The aircraft as claimed in claim 1, wherein the wing tip device is connected to the fixed wing by a hinge.

13. The aircraft of claim 1, wherein the first and second latches of the first pair of latches are in a plane perpendicular to rotational axes of the first and second latches of the first pair of latches, and the first and second latches of the second pair of latches are in a plane perpendicular to rotational axes of the first and second latches of the second pair of latches.

14. An aircraft comprising an aircraft wing, the aircraft wing comprising:
a fixed wing, and
a wing tip device at a tip of the fixed wing, wherein the wing tip device is configurable between (i) a locked flight configuration for use during flight, and (ii) a ground configuration for use during ground-based operations, while in the ground configuration the wing tip device is moved away from the locked flight configuration such that the span of the aircraft wing is reduced,
the aircraft wing further comprising a locking mechanism, the locking mechanism comprising:
a locked configuration for locking the wing tip device in the locked flight configuration, and
an unlocked configuration in which the wing tip device is configured to move into and out of the flight configuration,
the locking mechanism further comprising:
a locking pin mechanically attached to one of the fixed wing and wing tip device, and
a receiving socket mechanically attached to the other of the fixed wing and wing tip device,
wherein the receiving socket is arranged to receive the locking pin in when the wing tip device is in the locked flight configuration such that when the locking mechanism is in the locked configuration the locking pin cannot be removed from the receiving socket,
wherein the locking pin comprises a longitudinal axis and a distal end, where at the distal end a first protrusion extends in a first direction perpendicular to the longitudinal axis, and a second protrusion extends in a second direction perpendicular to the longitudinal axis, where the first direction is opposite to the second direction, and
the receiving socket comprises a receiving section for receiving the first protrusion and the second protrusion, the receiving socket further comprising a first rotatable latch and the second rotatable latch, the first rotatable latch and the second rotatable latch are arranged to engage with, and block, the removal of the first protrusion and the second protrusion respectively when the locking mechanism is in the locked configuration, the first rotatable latch and the second rotatable latch arranged to allow movement of the first protrusion and the second protrusion into and out of the receiving portion when the locking mechanism is in the unlocked configuration,
wherein the first rotatable latch and the second rotatable latch comprise a pivot point around which said first and second rotatable latches rotate, and the locking mechanism is arranged such that when under tension, the force transmitted through the first and second rotatable latches is directed directly through the pivot point.

15. An aircraft wing, the aircraft wing comprising:
a fixed wing, and
a wing tip device at a tip of the fixed wing,
wherein the wing tip device is configurable between (i) a flight configuration for use during flight, and (ii) a ground configuration for use during ground-based operations, while in the ground configuration the wing tip device is moved away from the flight configuration such that the span of the aircraft wing is reduced,
the aircraft wing further comprising a locking mechanism, the locking mechanism comprising a locked configuration for locking the wing tip device in the flight configuration and an unlocked configuration in which the wing tip device may move into and out of the flight configuration, the locking mechanism comprising:
a locking pin mechanically attached to one of the fixed wing and wing tip device, and
a receiving socket mechanically attached to the other of the fixed wing and wing tip device,
wherein the receiving socket is arranged to receive the locking pin when the wing tip device is in the flight configuration such that when the locking mechanism is in the locked configuration the locking pin cannot be removed from the receiving socket,
wherein the locking pin comprises a longitudinal axis, and a distal end, where at the distal end a first protrusion extends in a first direction perpendicular to the longitudinal axis, and a second protrusion extends in a second direction perpendicular to the longitudinal axis, where the first direction is opposite to the second direction, and
the receiving socket comprises a receiving section for receiving the first protrusion and the second protrusion, the receiving socket further comprising:
a first pair of rotatable latches on a first side of the receiving sprocket and including a first latch configured to engage a first rearward end face of the first protrusion to and a second latch configured to engage a second rearward end face of the first protrusion, and
a second pair of rotatable latches on a second side of the receiving sprocket opposite to the first side, the second pair of rotatable latches including a first latch configured to engage a first rearward end face of the second protrusion to and a second latch configured to engage a second rearward end face of the second protrusion,
wherein the first and second rotatable latches block removal of the first and second protrusions when the locking mechanism is in the locked configuration, and
wherein the first and second pairs of rotatable latches allow movement of the first and second protrusions when the locking mechanism is in the unlocked configuration.

16. A method to lock a wing tip device to a tip of a fixed wing, the method comprising:
moving the wing tip device from a ground configuration to a flight configuration;
as the wing tip device moves into the flight configuration, inserting a locking pin projecting from one of the wing tip device and the tip of the fixed wing into a slot in a receiving socket on the other of the wing tip device and the tip of the fixed wing;
as the locking pin is inserted into the slot of the receiving socket, a first pair of latches on a first side of the receiving socket opens to receive a first protrusion on a first side of the locking pin, and a second pair of latches on a second side of the receiving socket opens to receive a second protrusion on the second side of the locking pin;

as the first protrusion moves beyond the first pair of latches, a first latch of the first pair of latches engages a first rearward end face on the first protrusion, and a second latch of the first pair of latches engages a second rearward end face on the first protrusion, as the second protrusion moves beyond the second pair of latches, a first latch of the second pair of latches engages a first rearward end face on the second protrusion, and a second latch of the second pair of latches engages a second rearward end face on the second protrusion, and the engagement of the first and second pairs of latches with the respective first and second protrusions biases the locking pin in the slot against an abutment in the receiving socket to lock the wing tip device in the flight condition.

17. The method of claim 16, further comprising moving the wing tip device from the flight condition to the ground condition by pivoting the first and second pair of latches to an open position to release the first and second pair of latches from engagement with the first and second protrusions, and thereafter pivoting the wing tip device with respect to the fixed wing.

\* \* \* \* \*